United States Patent [19]

Kennedy

[11] 4,318,018
[45] Mar. 2, 1982

[54] ROTARY PULSE GENERATOR

[75] Inventor: Paul L. Kennedy, Meriden, Conn.

[73] Assignee: Veeder Industries, Inc., Hartford, Conn.

[21] Appl. No.: 142,077

[22] Filed: Apr. 21, 1980

[51] Int. Cl.³ .......................................... H02K 21/12
[52] U.S. Cl. .................................. 310/156; 310/257; 322/62; 324/174
[58] Field of Search ............... 310/168, 169, 170, 156, 310/75 R, 194, 159, 171, 257; 322/49, 51, 62; 324/173, 174, 163

[56] References Cited

U.S. PATENT DOCUMENTS 3,504,208 3/1970 Rivers .............................. 310/257 X
3,551,711 12/1970 Davis ................................... 310/156

Primary Examiner—J. V. Truhe
Assistant Examiner—Morris Ginsburg
Attorney, Agent, or Firm—Prutzman, Kalb, Chilton & Alix

[57] ABSTRACT

A transmission mounted speedometer pulse generator module having a permanent magnet rotor and coaxial pickup coil assembly axially offset therefrom and together compactly mounted within a housing sleeve inserted within a transmission housing bore to be driven for generating a pulse for each predetermined increment of travel of the associated vehicle.

4 Claims, 2 Drawing Figures

ROTARY PULSE GENERATOR

DESCRIPTION

1. Technical Field

The present invention relates to a new and improved rotary pulse generator having notable utility as a speedometer drive module mounted on a transmission housing in place of a conventional speedometer cable drive unit.

2. Disclosure of Invention

It is a principal aim of the present invention to provide a new and improved pulse generator module adapted to be mounted in place of a conventional speedometer cable drive unit to be driven to generate a train of pulses with a pulse for each predetermined increment of travel of the associated vehicle.

It is another aim of the present invention to provide a new and improved transmission mounted pulse generator module which is compact in construction and design and which provides for mounting the operating parts of the pulse generator module entirely within the usual transmission housing mounting bore originally provided for a speedometer cable drive unit. In accordance with the present invention, the pulse generator module has a housing sleeve adapted to be inserted within a standard transmission housing mounting bore and an electromagnetic pulse generator compactly mounted within that sleeve and thereby protected from road hazards and other external damage by both the pulse generator housing sleeve and the transmission housing.

It is another aim of the present invention to provide a new and improved pulse generator of compact design which provides a relatively high peak-to-peak voltage at relatively low rpm.

It is a further aim of the present invention to provide a new and improved rotary pulse generator design adapted to be manufactured at low cost on a mass production basis and which provides a long useful service-free life.

It is another aim of the present invention to provide a new and improved rotary pulse generator of the type having a rotary permanent magnet and a pickup coil assembly which generates an electrical pulse for each predetermined increment of rotation of the rotor. In accordance with the present invention, the new and improved pulse generator has a low magnetic detent torque which reduces harmonic oscillation of the rotor and resultant generation of spurious pulses.

Other objects will be in part obvious and in part pointed out more in detail hereinafter.

A better understanding of the invention will be obtained from the following detailed description and the accompanying drawing of an illustrative application of the invention.

BEST MODE FOR CARRYING OUT THE INVENTION

Figure 1:
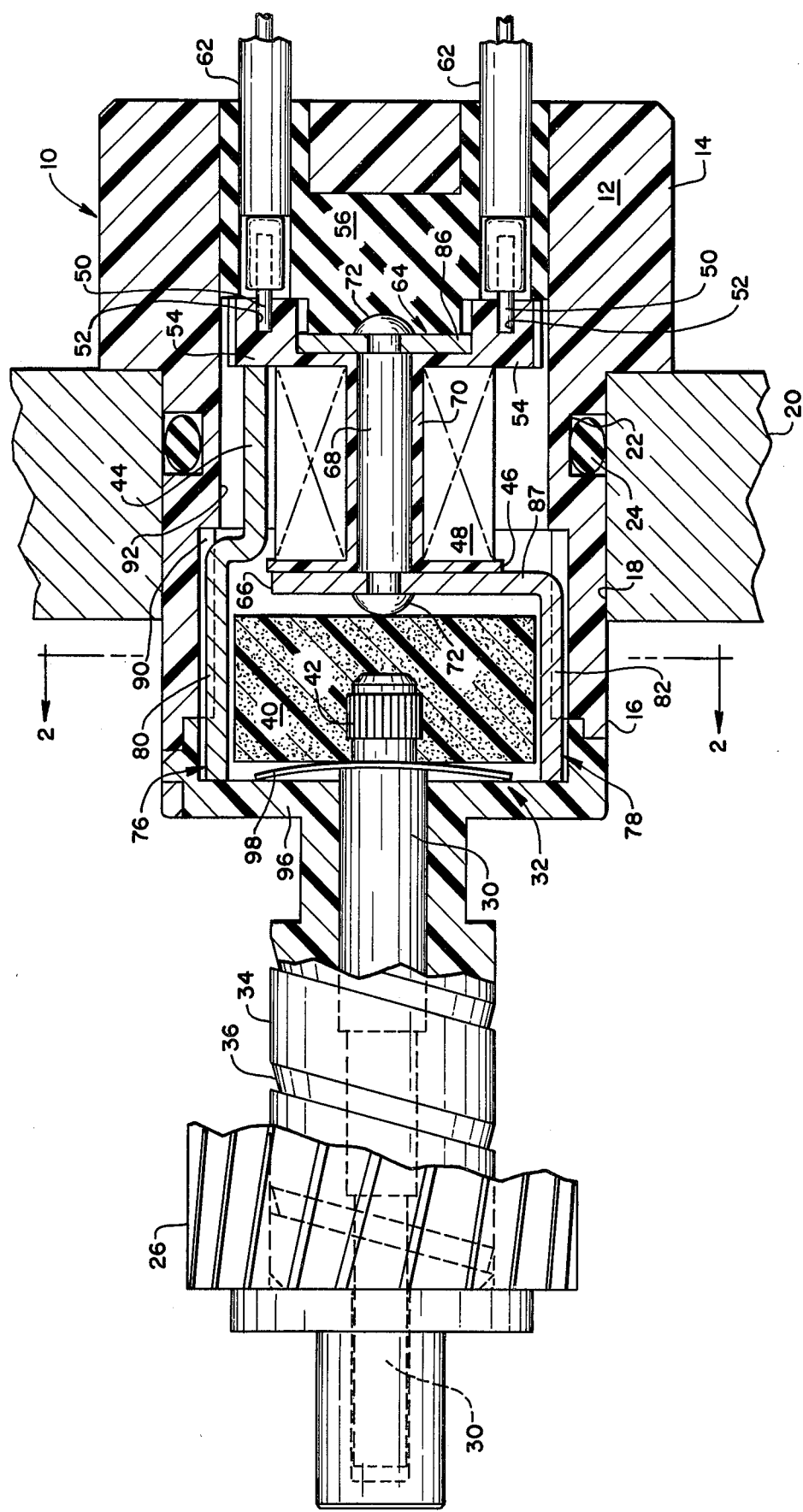
FIG. 1 is an axial section view, partly broken away and partly in section, showing a rotary pulse generator incorporating an embodiment of the present invention mounted within a bore of a transmission housing.

Referring now to the drawing in detail wherein like numerals represent like parts throughout, a pulse generator module 10 incorporating an embodiment of the present invention is shown comprising a generally cylindrical housing 12 having an outer circular radial flange 14 and an inner generally cylindrical sleeve section 16 which together provide for installing the pulse generator within a cylindrical bore 18 of a vehicle transmission housing 20 with the flange 14 engaging its outer surface. The inner sleeve section 16 is formed with a peripheral annulus 22 for receiving a suitable O-ring 24 for sealing the transmission housing bore 18, and suitable fasteners (not shown) are provided for securing the peripheral flange to the transmission housing. The housing 12 is preferably molded of a zinc alloy or a suitable plastic capable of withstanding the maximum operating temperature of up to 300° Fahrenheit of conventional automatic transmissions. Also the outer diameter of the inner sleeve section 16 is preferably approximately 0.8725 inches so that the pulse generator module 10 can be inserted as shown in a standard transmission bore 18 originally provided for a speedometer cable connector unit (not shown). In addition, a conventional helical drive gear 26 of the pulse generator module 10 is located so that the pulse generator module 10 can be easily substituted for a conventional speedometer cable drive unit (not shown) without modification of the transmission.

A pulse generator drive shaft 30 is coaxially mounted within a molded plastic inner housing cap 32 that is suitably secured to the inner end of the cylindrical housing 12. The inner housing cap 32 has an enlarged inner generally cylindrical end 34 with a left-hand helical groove 36 (extending helically from the end of the cap in the counterclockwise direction as viewed from the inner end of the pulse generator). The helical drive gear 26 is rotated (in the counterclockwise direction as viewed from the inner end of the pulse generator) and cooperates with the helical groove 36 to provide an oil slinger for preventing passage of oil to the drive shaft 30 and into the housing cavity. The helical drive gear 26 is keyed for rotating the pulse generator drive shaft 30 and is driven by the usual speedometer cable drive gear (not shown) of the transmission to rotate the pulse generator drive shaft 30 in accordance with the rotation of the associated vehicle drive shaft (not shown) and therefore the speed of the vehicle. Preferably, the drive shaft 30 is geared to be rotated one thousand rpm for each vehicle mile and therefore one revolution for each one-thousandth of a mile travelled by the vehicle.

Figure 2:
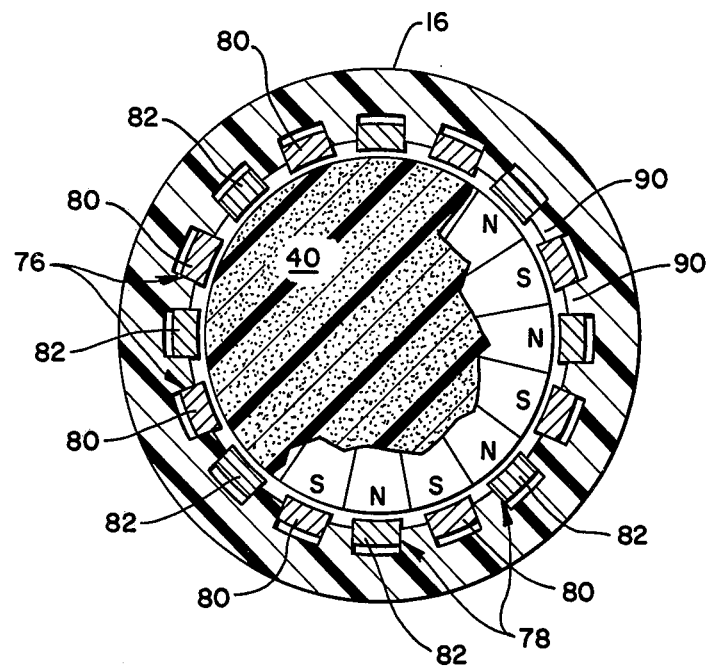
FIG. 2 is an enlarged transverse section view, partly broken away and partly in section, of the rotary pulse generator taken substantially along line 2—2 of FIG. 1.

A cylindrical permanent magnet 40 is mounted on a reduced knurled end 42 of the drive shaft 30 to be rotated directly by the drive shaft 30 and therefore at a speed proportional to the speed of the associated vehicle. For example, the permanent magnet 40 is molded from a thermoplastic material having magnetically oriented barium ferrite particles. As shown in FIG. 2, the rotor permanent magnet 40 is magnetized with sixteen equiangularly spaced peripheral poles of alternating north and south polarity. As will be more clearly understood from the description hereinafter, the permanent magnet rotor 40 provides for generating eight pulse cycles per revolution or eight thousand pulse cycles per mile with each pulse cycle comprising two pulses of opposite polarity.

A pulse generator pickup subassembly 44 is mounted within the inner housing sleeve section 16 in cooperation with the permanent magnet rotor 40. The pickup subassembly 44 comprises a circular coil bobbin 46 and a coil 48 wound on the bobbin 46 and having leads wound around terminals 50 inserted into openings 52 in diametrically opposed terminal mounting lugs 54 at the outer axial end of the bobbin 46. A rubber grommet 56 is mounted within the outer end flange 14 of the housing 12 and suitable wire output leads 62 are mounted within laterally spaced openings in the grommet 56 with their inner ends electrically connected to the coil terminals 50.

A pair of coaxial pole pieces 64, 66 are held against the opposite axial ends of the bobbin 46 by an axially extending core rod 68 mounted within a central opening 70 in the bobbin 46. The core rod 68 has reduced ends with enlarged rounded heads 72 upset against the pole pieces 64, 66 for securing the pole pieces and bobbin together and to provide a good magnetic circuit between the pole pieces. The pole pieces 64, 66 have respective annular arrangements 76, 78 of eight equiangularly spaced axially extending elongated pole fingers 80, 82 respectively, which encircle the permanent magnet rotor. The two sets of pole fingers 80, 82 are angularly spaced to provide an annular arrangement of sixteen equiangularly spaced poles of alternating polarity. Thus, each pole piece 64, 66 is formed into a generally cup or basket shape having a central plate portion 86 or 87 providing a coil end face and an annular arrangement 76 or 78 of axially extending pole fingers 80 or 82 providing respective stator poles. Also, in the case of the outer pole piece 64, the eight axially extending pole fingers 80 have a first annular section surrounding the rotor 40 with a diameter equal to the diameter of the other annular pole set 78 and a second reduced annular section surrounding the coil 48 and having an outer diameter less than the outer diameter of the other annular section. The offset of the reduced annular section enables the inner housing sleeve section 16 to be made sufficiently thick to provide the O-ring annulus 22. Also, the inner housing sleeve section 16 is formed with internal lugs 90 and intermediate slots 92 inwardly of the annulus for receiving the pole fingers 80, 82 and thereby locate the stator poles. The inner ends of the pole fingers 80, 82 engage a radial end flange 96 of the inner housing cap 32 and such that the pickup subassembly 44 is secured between the outer rubber grommet 56 and the housing end cap 32. A light Belleville washer 98 is mounted between the cap end flange 96 and the permanent magnet rotor 40 to bias the rotor 40 into engagement with the adjacent rounded end 72 of the central core rod 68, thereby frictionally restraining the permanent magnet rotor 40 against angular oscillation and holding it against axial end play.

As can be seen, the annular pickup coil 48 is mounted coaxially with the permanent magnet rotor 40 and the two coaxial pole pieces 64, 66 at the opposite axial ends of the coil 48 provide with the central core rod 68 a ferromagnetic circuit for generating an electrical pulse in the coil 48 for each magnetic reversal produced by the rotating permanent magnet rotor 40. With the described annular arrangement of sixteen rotor poles and sixteen stator poles, a sixteen pulse AC output is generated for each revolution of the rotor 40. It has been found that a relatively high peak-to-peak voltage amplitude of up to one volt or more is generated when the drive shaft 30 is rotated at a relatively low rate of 0.28 revolution per second equal to a vehicle speed of 1 MPH (when the pulse generator drive shaft 30 is rotated at a rate of one-thousand revolutions per mile).

Also, the rotor 40 and pickup subassembly 44 are mounted substantially entirely within the transmission housing 20 to provide a very compact and mostly hidden unit, and such that the operating parts of the pulse generator module 10 are protected by both the transmission housing 20 and the pulse generator housing 12 against road hazards and other external damage and are maintained at the relatively even internal temperature of the transmission and so as to avoid pulse signal variations resulting from temperature variations. Further, the pulse generator has a relatively low magnetic detent torque because of the relatively small diameter permanent magnet rotor 40 and relatively large number (e.g. sixteen) of stator poles, and such that detent torque caused rotor oscillation is minimized and resulting spurious pulse generation is prevented.

As will be apparent to persons skilled in the art, various modifications, adaptations and variations of the foregoing specific disclosure can be made without departing from the teachings of the present invention.

We claim:

1. In a transmission mountable rotary pulse generator module useable in place of a conventional speedometer cable drive unit for generating a pulse for each predetermined increment of travel of an associated vehicle, comprising an elongated housing with a generally cylindrical inner sleeve section having an outer diameter less than one inch to be adapted to be mounted within a transmission housing bore, an inner drive shaft coaxially mounted on the inner sleeve section for being rotated by the transmission, and a pulse generator mounted within the housing and driven by the drive shaft for generating a train of pulses with a pulse for each predetermined increment of rotation of the drive shaft, the improvement wherein the pulse generator comprises a permanent magnet rotor, coaxially mounted on the drive shaft within the inner sleeve section, having an even plurality of generally equiangularly spaced magnetic poles of alternating polarity, and a physically integrated pickup coil subassembly mounted within the housing generally coaxially with the rotor and axially outwardly thereof and generally completely within the inner sleeve section, and having a coaxial annular coil mounted within the inner sleeve section and a stator core having a central core extending axially through the coil and two coaxial generally basket shaped pole pieces at opposite ends of the coil respectively, the two generally basket shaped pole pieces being integrally secured to the central core to provide said physically integrated subassembly and having alternating axially inwardly extending pole fingers respectively forming an annular arrangement of an even plurality of stator poles of alternating polarity within the inner sleeve section and adjacent the permanent magnet rotor for generating an AC coil output signal with the permanent magnet rotor, the inner sleeve section having an annular arrangement of axially extending slots receiving the pole fingers to accurately position the pole fingers adjacent to the permanent magnet rotor.

2. A transmission mountable rotary pulse generator module according to claim 1 wherein the two basket shaped pole pieces comprise a first basket shaped pole piece at one axial end of the coil and adjacent the rotor and having a first set of said generally equiangularly spaced axially extending pole fingers forming a first annular arrangement thereof surrrounding the rotor, and a second basket shaped pole piece at the other axial end of the coil having a second set of said generally axially extending pole fingers forming an annular arrangement thereof surrounding the coil and rotor and spaced between the pole fingers of said first annular arrangement.

3. A transmission mountable rotary pulse generator module according to claim 2 wherein the annular arrangement of the said second set of pole fingers has a first annular section thereof surrounding the rotor and a second annular section thereof of less diameter than said first annular section surrounding the coil.

4. A transmission mountable rotary pulse generator module according to claims 1, 2 or 3 wherein the elongated housing has an inwardly facing annular shoulder having a larger diameter than the inner sleeve section for engagement with the transmission housing to position the inner sleeve section within the transmission housing bore, wherein the inner sleeve section has an outer peripheral annulus axially inwardly of the annular shoulder and wherein the pulse generator module further comprises an annular seal within said annulus to provide a seal between the inner sleeve section and the transmission housing bore.

\* \* \* \* \*